Nov. 22, 1949
W. ENGSTROM
2,488,769
ENGINE ACCESSORY DRIVE COUPLING
Filed Feb. 6, 1945
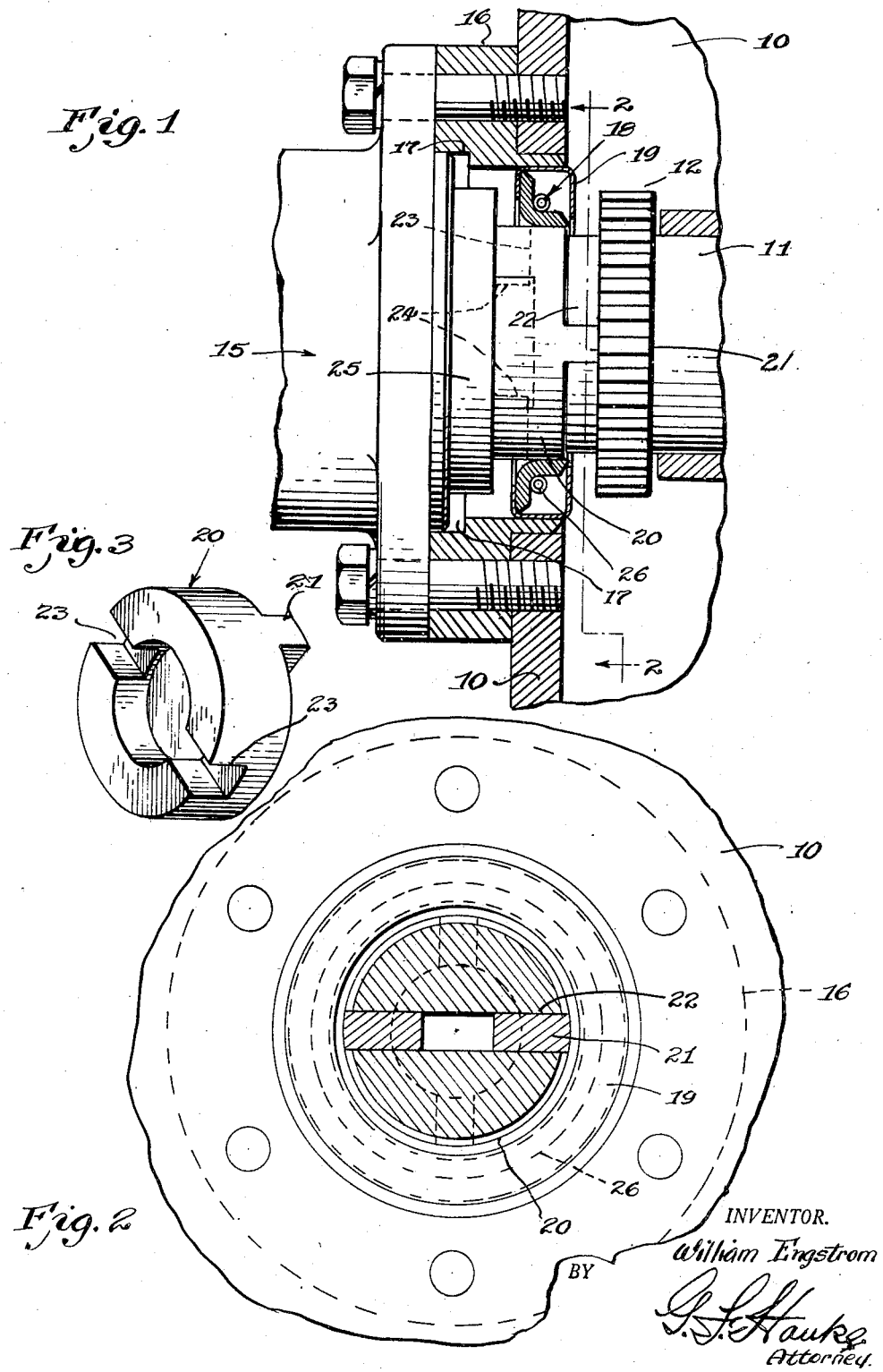
INVENTOR.
William Engstrom
BY
G. L. Hauke
Attorney.

Patented Nov. 22, 1949

2,488,769

UNITED STATES PATENT OFFICE 2,488,769

ENGINE ACCESSORY DRIVE COUPLING

William Engstrom, Muskegon, Mich., assignor to Continental Motors Corporation, Muskegon, Mich., a corporation of Virginia Application February 6, 1945, Serial No. 576,487

3 Claims. (Cl. 286—7)

My invention relates to engines and more particularly to an accessory drive embodying an oil seal particularly applicable for enclosing a coupling which drivingly connects a drive shaft with a magneto.

An engine magneto is normally mounted on the front plate of the engine, and the lugs on the magneto engage with slots in the governor gear. This construction has resulted in difficulties because it seems that although the magneto carries an oil seal, the oil still gets through this seal to the breaker point mechanism of the magneto.

An object of my present invention is to construct an improved accessory drive substantially of the type customarily employed and provided with an improved oil seal construction combined with an improved coupling structure.

More particularly, it is the object of my invention to construct an improved magneto drive and oil seal by providing an Oldham coupling between the engine magneto drive means and the engine, and which floats in an oil sealing device, the combination of the oil seal and coupling keeping the oil which is being splashed around inside of the engine casing from finding its way into the magneto.

For a more detailed understanding of my invention reference may be had to the accompanying drawing illustrating a preferred embodiment of the invention and in which:

Fig. 1 is a vertical longitudinal sectional view of the coupling and seal constructed in accordance with my invention, Fig. 2 is a sectional view taken on the line 2—2 of Fig. 1, and Fig. 3 is a detail perspective view of the Oldham coupling.

The engine is here illustrated by showing a fragmentary portion of the crankcase 10, said being hereafter referred to as a casing, which supports a drive shaft 11 carrying a gear 12. It is customary to slot the hub of this gear and to attach same to a lug carried by the magneto drive.

The magneto 15 as illustrated in Fig. 1 is mounted on the external wall of the engine casing 10, and in the present improved construction, a spacer or adapter 16 is interposed between the magneto and engine casing, this adapter having a bore 17 which pilots the magneto, and which also supports an oil seal device 18. The oil seal device comprises a yielding member or ring 18a housed within a sheet metal cage 19, and said device encircles the Oldham coupling 20.

This Oldham coupling 20 has lugs 21 on one face which fit into the slot 22 carried on the engine drive means, such as the hub of the gear 12, and a groove 23 into which the lug 24 of the magneto drive shaft 25 is engaged. This Oldham coupling floats in the oil seal device 18, said yielding member 18a being urged into sealing contact with external cylindrical surface of the Oldham coupling by the spring element 26.

The combination of this oil seal device and the Oldham coupling, which floats in said device, keeps the oil from getting into the magneto. This construction gives a closely coupled accessory arrangement, and eliminates the danger of encountering trouble from oil leakage into the breaker points of the magneto.

Although I have illustrated but one form of my invention and have described in detail but a single application thereof, it will be apparent to those skilled in the art to which my invention pertains, that various modifications and changes may be made therein without departing from the spirit of my invention or from the scope of the appended claims.

I claim:

1. An oil seal and coupling assembly for connecting axially aligned driving and driven means and comprising an adapter supported in axial alignment with said driving and driven means, an oil seal structure carried by said adapter and comprising a ring having a radially flexible and inwardly extending oil seal member, and an intermediate coupling member drivingly connecting said driving and driven means and having an external cylindrical surface disposed in engagement only with said oil seal member.

2. An oil seal and coupling assembly for connecting axially aligned driving and driven means and comprising an adapter supported in axial alignment with said driving and driven means, an oil seal structure carried by said adapter and comprising a ring having a radially flexible and inwardly extending oil seal member, and an intermediate coupling member drivingly connecting said driving and driven means and having an external cylindrical surface disposed in engagement only with said oil seal member, said coupling member comprising an offset tongue on one face and a groove on said other face and extending in a plane normal to the plane of the tongue, said member floating internally of said oil seal member.

3. An oil seal and coupling assembly for connecting axially aligned driving and driven means and comprising an adapter supported in axial alignment with said driving and driven means, an oil seal structure carried by said adapter and comprising a ring having a radially flexible and inwardly extending oil seal member, and an intermediate coupling member drivingly connecting said driving and driven means and having an external cylindrical surface disposed in engagement only with said oil seal member, said oil seal structure and said coupling member housed substantially entirely within said adapter.

WILLIAM ENGSTROM.

REFERENCES CITED

The following references are of record in the file of this patent:

UNITED STATES PATENTS

| Number | Name | Date |
|---|---|---|
| Re. 18,829 | Nelson | May 9, 1933 |
| 1,174,545 | Butterfield | Mar. 7, 1916 |
| 1,218,822 | Witry | Mar. 13, 1917 |
| 1,247,642 | Clark et al. | Nov. 27, 1917 |
| 1,388,540 | Wise | Aug. 23, 1921 |
| 1,449,800 | Woolson | Mar. 27, 1923 |
| 1,516,247 | Richroath | Nov. 18, 1924 |
| 1,522,612 | Burchett | Jan. 13, 1925 |
| 1,641,840 | Enyart | Sept. 6, 1927 |
| 1,805,668 | Kelley | May 19, 1931 |
| 2,144,445 | Wilber | Jan. 17, 1939 |
| 2,146,677 | Johnson | Feb. 7, 1939 |
| 2,365,146 | Wichorek | Dec. 12, 1944 |